(12) United States Patent
Meyer

(10) Patent No.: US 7,015,687 B2
(45) Date of Patent: Mar. 21, 2006

(54) INDUCTIVE POSITION SENSOR WITH A CURSOR AND A COUPLING SCALE

(76) Inventor: Hans Ulrich Meyer, 42, Rue de Lausanne, Morges (CH) 1110

( * ) Notice: Subject to any disclaimer, the term of this patent is extended or adjusted under 35 U.S.C. 154(b) by 190 days.

(21) Appl. No.: 10/462,605

(22) Filed: Jun. 17, 2003

(65) Prior Publication Data

US 2004/0004472 A1   Jan. 8, 2004

(30) Foreign Application Priority Data

Jul. 3, 2002 (CH) .................................... 1162/02

(51) Int. Cl.
*G01B 7/14* (2006.01)
*G01B 7/30* (2006.01)

(52) U.S. Cl. ............................. 324/207.17; 324/207.24

(58) Field of Classification Search ........... 324/207.11, 324/207.15–19, 207.22–25, 239–243, 163–164, 324/173; 336/45, 130, 136; 340/870.32–33, 340/870.35–36; 318/653, 656–657, 661

See application file for complete search history.

(56) References Cited

U.S. PATENT DOCUMENTS

| | | | | |
|---|---|---|---|---|
| 4,356,732 A | * | 11/1982 | Hachtel et al. | 73/862.331 |
| 5,804,963 A | * | 9/1998 | Meyer | 324/207.17 |
| 5,936,399 A | * | 8/1999 | Andermo et al. | 324/207.17 |
| 6,720,760 B1 | * | 4/2004 | Milvich | 324/207.17 |

FOREIGN PATENT DOCUMENTS

| | | |
|---|---|---|
| EP | 0 785 415 A1 | 7/1997 |
| EP | 0 908 702 A2 | 4/1999 |

* cited by examiner

*Primary Examiner*—Edward Lefkowitz
*Assistant Examiner*—David M Schindler
(74) *Attorney, Agent, or Firm*—Young & Thompson

(57) ABSTRACT

The inductive position sensor includes a scale (10) with a series of conductive loops spaced out by a pitch T and a cursor (20) provided with conductors forming each a series of alternating hairpin turns spaced out by a pitch T, the inducing (21 to 23; 42, 44) and induced (31 to 33; 41, 43) cursor conductors are laid out in two separate interlaced conductor groups, coupling between inducing and induced conductors of the second group taking place only via the scale loops. Such a sensor is simple, robust, accurate, insensitive to external electromagnetic fields and tolerant of misalignment between cursor and scale.

2 Claims, 2 Drawing Sheets

INDUCTIVE POSITION SENSOR WITH A CURSOR AND A COUPLING SCALE

FIELD OF THE INVENTION

The invention is an inductive position sensor including a scale and a cursor movable relatively to each other along a measuring path, the scale including one or several conductors forming a series of conductive loops spaced along the measuring path by a pitch T, the cursor including inducing and induced conductors, connected to an electronic measuring circuit and each forming a series of alternating hairpin turns spaced along the measuring path by a pitch T.

BACKGROUND OF THE INVENTION

U.S. Pat. No. 5,804,963 discloses an inductive position sensor including the above-described features. The position of the cursor relative to the scale along the path is derived from the measurement of the coupling between inducing and induced cursor conductors via the scale conductors. The magnetic fields generated and picked up by the cursor and scale conductors of such a sensor have a polarity reversal every pitch T along the measuring path. This sensor is insensitive to magnetic fields of homogeneous intensity and direction, such as generated by sources outside the sensor, the current they induce in two alternating hairpin turns being nil.

In a first embodiment disclosed in said patent, the cursor conductors are separated, strongly attenuating direct coupling between inducing and induced cursor conductors. But, as each conductor only faces a fraction of the scale surface facing the cursor, coupling between inducing and induced cursor conductors via the scale conductors is also reduced. Moreover, misalignment between scale and cursor gives rise to uneven coupling, altering measurements.

In a second embodiment disclosed in said patent, the cursor conductors are all interlaced: as each conductor faces the whole scale surface across the cursor, coupling between inducing and induced cursor conductors via the scale conductors reaches its maximum level. Misalignment between scale and cursor affects measurement only slightly, as it tends to affect all couplings the same way. But direct coupling between cursor conductors is important and leads to measurement errors getting larger with decreasing coupling via the scale, i.e. with increasing scale-to-cursor gap.

In order to increase measurement accuracy and to make it independent from said gap, direct coupling should be made negligible as compared to coupling via the scale, and the latter should remain unaffected by misalignment between cursor and scale.

SUMMARY OF THE INVENTION

To this end, the invention is characterized in that the cursor's conductors are arranged in at least one first group and in at least one second group separate from the first group, each group having N interlaced conductors set apart by a multiple of T/N, the first group being made up of the inducing conductors and the second group being made up of the induced conductors, coupling between the inducing and induced conductors from the first and second groups taking place via the scale's conductors.

These characteristics allow a sensor to be far less sensitive to changes in scale-to-cursor gap, by eliminating detrimental direct coupling between cursor conductors while maintaining coupling via the scale at one half of their maximum possible level. The separate groups of N conductors allow activating N configurations, identical but shifted by T/N, of at least one inducing and one induced conductor. The absence of direct couplings as well as more uniform coupling via the scale, achieved by grouping together the inducing conductors on one hand and the induced ones on the other, makes coupling as a periodic function of the position of the cursor along the scale in said N configurations more uniform, yielding better accuracy, even for comparatively large scale-to-cursor gaps.

Optimally, the conductors of each one of both cursor groups form meanders or zigzags going back and forth along the measuring path. Direct magnetic coupling between an inducing back-and-forth zigzag and an induced one decreases strongly with their separation, given that each one forms a series of virtually closed inducing or induced loops of alternating polarity, whose opposite effects tend to cancel. Also, as such a back-and-forth zigzag is a closed line, it may be cut anywhere to be connected to the measuring circuit by a pair of very close conductors whose contribution to inductance, hence to coupling, is insignificant. For a given separation between inducing and induced groups, the scale-to-cursor gap may vary more, leading to simpler alignment of the cursor along the scale.

In a preferred embodiment, the scale includes a series of closed conductive loops, and the cursor's first and second groups of inducing and induced conductors are side by side along the same stretch of the measuring path. As a result, currents induced in the scale flow across said path rather than along it, making the sensor insensitive to magnetic fields influencing the part of the scale not facing the cursor.

In such an embodiment, one group of conductors may extend beyond the other both ways along the measuring path, which provides uniform coupling via the scale over the shorter group's extent, thus also between any inducing conductor and any induced conductor having the same mutual shift along the path x.

In a preferred embodiment of a sensor according to the invention the cursor has three inducing conductors and three induced conductors, the zigzags of the inducing conductors, as well as those from the induced conductors being mutually shifted by T/3 along the measuring path, the position along the measuring path of each inducing conductor coinciding with the one of an induced conductor. An electronic circuit measures the coupling of each inducing conductor to both induced conductors shifted from said inducing conductor's position and connected in series, so as to be equivalent to a virtual induced conductor located in between, and thus shifted by T/2 from the inducing one. This cancels the continuous component of the coupling as a function of the position. The zigzags having an approximately sinusoidal shape of period 2T, three sine waves of period T and mutually shifted by T/3 are thus obtained. With the complementary signals obtained e.g. by reversing the induced conductor's polarity, one gets a repetitive sequence of six signals, whose periodic couplings as a function of the cursor's position relative to the scale are progressively shifted by T/6.

The electronic circuit is consequently arranged to activate in a repetitive sequence six configurations of one inducing conductor, and two induced conductors connected in series, whose coupling as a function of the cursor's position along the measuring path is progressively shifted by T/6, the phase difference between the fundamental component of said repetitive sequence of sampled measurements and a reference signal being a linear function of the position along the measuring path.

In another embodiment of a sensor according to the invention, the cursor includes two inducing conductors and two induced conductors, both inducing conductors' as well as both induced conductors' zigzags being mutually shifted by T/2 along the measuring path, the inducing and induced conductors' zigzags being mutually shifted by T/4 along the measuring path.

The electronic circuit is preferably arranged to measure the four couplings from each inducing conductor to each induced conductor via the scale, each coupling's measurement polarity being set so that the four couplings measured as a function of the cursor's position along the scale are four sine waves of period T progressively shifted by T/4, having the same amplitude and the same continuous component.

The continuous component may therefore be discarded, e.g. by measuring these four couplings sequentially. The symmetry between both inducing conductors, and between both induced ones, makes it easier to match both inductances and transmission line characteristics necessary for uniform coupling between inducing and induced conductors.

Several embodiments of the scale are advantageous: the scale may be a conductive ladder structure with each rung shared by two conductive loops closed by the uprights and the adjoining rungs. The scale may consist of a circuit printed on an insulating or a ferromagnetic substrate: it is then possible to have one or several separate conductive loops, to decrease coupling along the scale even further. Conversely, if the inducing and induced cursor conductors are not side by side but follow each other, coupling takes place along the scale, e.g. by means of one conductor in the shape of a zigzag going back and forth. The scale and cursor may be cylindrical with an axial displacement, with ring-shaped scale conductors, the inducing and induced cursor conductors being laid out alongside, yielding a small diameter and measurement unaffected by axial rotation. For a rotary encoder, the scale conductor may be in the shape of a closed zigzag.

BRIEF DESCRIPTION OF THE DRAWINGS

Other advantages stand out from the characteristics expressed in the claims and from the description below, disclosing the invention at length with the help of the drawings schematically displaying by way of example some preferred embodiments of the invention.

FIGS. from 4A to 4E display different scales for sensors according to the invention.

DESCRIPTION OF THE PREFERRED EMBODIMENTS

Figure 1:
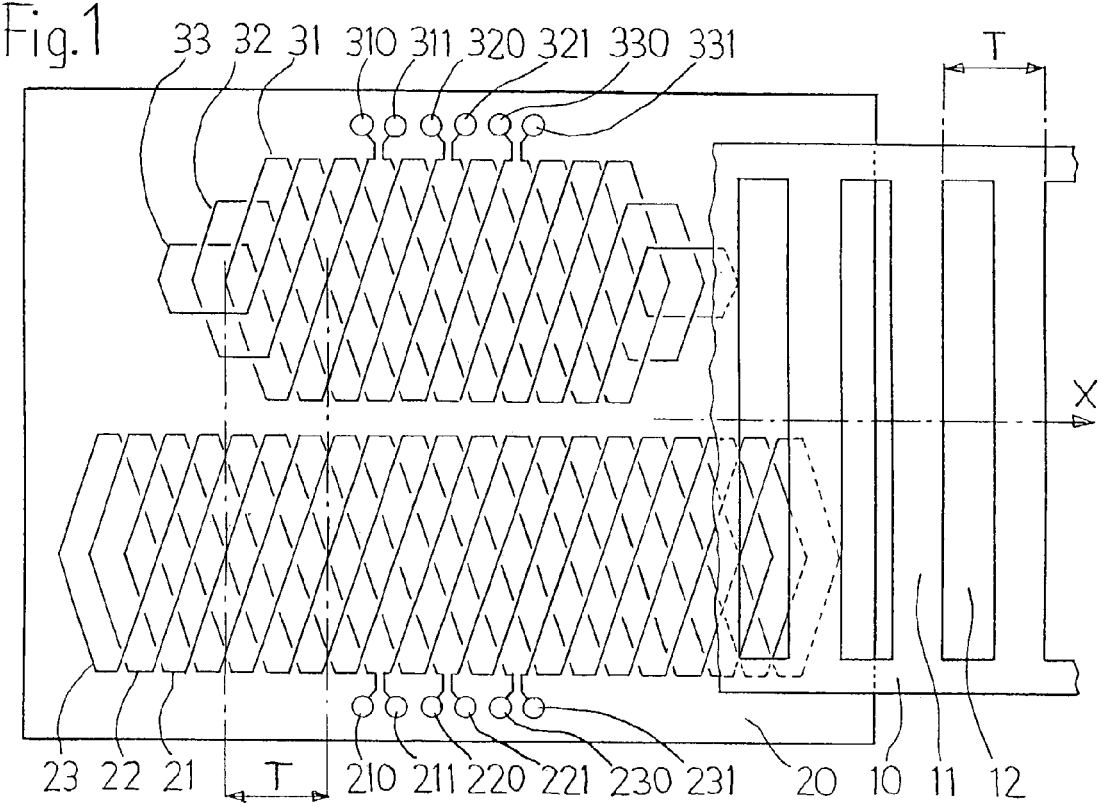
FIG. 1 shows by way of example the scale and the cursor of a sensor according to the invention.

The scale 10 and the cursor 20 of a sensor according to the invention are shown in FIG. 1; they are relatively movable along a measuring path x, here a straight one. The surface of the cursor 20 facing the scale is shown, as well as a part only of the scale 10, so the cursor stays visible. The planes of the surfaces of the scale 10 and of the cursor 20 facing each other are parallel to the plane of the figure.

The scale 10 is a conductive ribbon in the shape of a ladder whose rungs 11 are spaced out by a pitch T, forming a series of conductive loops also spaced out by T. Each conductive loop circles around an opening 12 between two rungs 11.

The cursor 20 has two groups of N=3 interlaced conductors, each conductor forming a zigzag of spatial period 2T whose successive hairpin turns are thus spaced out by the pitch T along the path. The inducing conductors 21, 22, 23 constitute one group, and the induced conductors 31, 32, 33 constitute the other group. These two groups are arranged side by side along the measuring path x.

Alternately, if the scale is made by a conductor in the shape of a closed zigzag, both groups may follow each other along the measuring path x, as currents induced in the scale will also flow along it. But, in the following description, the scale consists of a series of closed loops, and the conductor groups are side by side. The advantages of such an embodiment are the degree of coupling which does not depend on scale length and the lack of sensitivity to currents induced in areas of the scale not facing the cursor, as the latter flow across the measuring path rather than along it.

Coupling from an inducing conductor 21, 22, 23 to an induced one 31, 32, 33 takes place via the scale conductors. As an inducing conductor forms a series of alternating hairpin turns, coupling from an inducing conductor to a scale loop is a periodic function of the position x, of period 2T, as it is maximum at every pitch T, where said inducing conductor's bends are facing scale loops, and as coupling polarity reverses from one hairpin turn to the next. Currents induced in adjacent loops of the scale also have opposed polarity. Thus, the direction of current in the scale 10 reverses from rung to rung. By analogy, the coupling from a scale loop to an induced conductor as a function of x is again periodic with a period 2T. Coupling from an inducing conductor to an induced one via the scale is the product of said two couplings, having a period 2T as a function of x: it will thus also be a periodic function of x, but with a period T. Coupling from another inducing conductor shifted from the former by T/N, here T/3, to another induced conductor also shifted from the former by T/3, will be the same function of x, with the same period T, but shifted by T/3 from the former. This is as long as direct coupling from inducing to induced conductors remains insignificant.

In order to improve coupling via the scale 10, and above all strongly reduce direct coupling, the cursor conductors 21, 22, 23, 31, 32, 33 form zigzags going back and forth along the measuring path x. Direct magnetic coupling between such inducing and induced zigzags strongly decreases with their separation, given that each such zigzag forms a series of virtually closed loops of alternating polarity, whose coupling contributions tend to cancel. Additionally, such a back-and-forth zigzag forms a closed line and can thus be connected to the measuring circuit by two very close conductors whose contribution to inductance, hence to coupling, is negligible. In other words, the inducing conductors 21, 22, 23 in the shape of back-and-forth zigzags have very weak fields outside their perimeter, where the contributions from current loops of opposed polarities tend to cancel, and the equally shaped induced conductors 31, 32, 33 are insensitive to external fields, which tend to be homogeneous in the induced conductor's area. Connections to the electronic measuring circuit are made by bifilar lines from the ends 210–211, 220–221, 230–231, 310–311, 320–321, 330–331 of the conductors 21, 22, 23, 31, 32, 33 respectively.

For accurate measurement, coupling via the scale from any inducing conductor to any induced conductor having the same mutual shift along x must be uniform. This is the case for circular measuring paths, if inducing and induced conductors take up the whole perimeter. It is also the case for a straight measuring path, if one of the interlaced cursor conductor groups extends well beyond the other both ways along the measuring path x, which provides uniform coupling via the scale over the shorter group's extent, between any inducing conductor and any induced conductor having the same mutual shift along the path x. In the embodiment shown in FIG. 1 it is the group of inducing conductors 21, 22, 23 which is longer than the group of induced ones 31, 32, 33: the spatially periodic electromagnetic fields from the inducing conductors 21, 22, 23, and consequently those from the scale, have thus a constant amplitude over the induced conductors' extent, ensuring uniform coupling as long as each induced conductor 31, 32, 33 has the same extent, which is the case here.

The insensitivity of a sensor according to the invention to liquids (water, oil, ink), to dust and to electrical and magnetic fields, as well as its tolerance to gap variations and misalignment between scale and cursor, allow its use in most cases without any protection and shielding, and with simple external guiding: installation and maintenance costs of such a sensor are thus minimal, making it suitable for low cost applications. Therefore, the sensor must be dimensioned for economical manufacturing while ensuring a sufficient measuring accuracy. The pitch T should not be too large to limit interpolation error, which increases with T, nor too small to allow a sufficient scale-to-cursor gap, as coupling between cursor conductors via the scale decreases by half for each increase of 0.11T in gap. For an accuracy of a few micrometers and a gap of a few tenths of a millimeter, a pitch T from one to two millimeters is optimal. If the cursor is a printed circuit, the number N of conductors per group should be low, in order to keep line spacing, equal to T/N, reasonable, and accessorily to limit the number of connections to the measuring electronics. The cursor 20 shown in FIG. 1 has only N=3 conductors per group.

For a sensor according to the invention, coupling as a function of the position x between cursor conductors via the scale is periodic, with a period equal to the pitch T. The zigzag conductors (21 to 23, 31 to 33) of the cursor 20 shown in FIG. 1 have an approximately sinusoidal shape of period 2T: coupling as a function of the position x from an inducing conductor to the scale, as well as from the scale to an induced conductor, is thus practically a sine wave having the same period 2T as the zigzag. Coupling via the scale from an inducing conductor to an induced one, as a function of the position x, is thus a product of two such sine waves of period 2T, i.e. a sine wave of period T plus a continuous component which becomes zero if the inducing and induced conductors are offset along x by T/2, which is the case in this embodiment.

It should be remarked that residual harmonics of coupling as a function of x decrease quickly with increasing scale-to-cursor gap: a gap increase may thus improve linearity, as long as the influence of direct coupling remains negligible.

The three inducing conductors 21, 22, 23, shifted one from the other by T/3, and the three induced conductors 31, 32, 33, also shifted one from the other by T/3, having respectively the same position within a pitch T along the measuring path x, two induced conductors must be combined to act as one virtual induced conductor shifted by T/2 from the inducing one, so as to eliminate the continuous component. For the inducing conductor 21, this corresponding virtual induced conductor is located between the induced conductors 32 and 33, and is obtained by connecting their ends 321 and 331 together, the signal being measured between their other ends 320 and 330 (configuration a). Likewise for the inducing conductor 22, the induced conductors 33 and 31 are connected in series by their ends 331 and 311 (configuration e), and for the inducing conductor 23, the induced conductors 31 and 32 are connected in series by their ends 311 and 321 (configuration c).

These three coupling configurations are mutually shifted by 2T/3 along the path x. The three sine wave coupling functions of x are thus also mutually shifted by 2T/3, or by T/3 the other way, as their period is T. Inversed measurements are done with configurations d, b, f, having the same configurations of inducing and induced conductors as configurations a, e, c respectively, but with their connections to the measuring circuit reversed, effectively shifting their coupling functions by T/2. This is only the case because here the above-mentioned continuous component is of coupling is nil. This finally yields the six following conductor configurations, whose coupling functions of x are progressively shifted by T/6:

a) inducing: 21, induced: 32 and 33 in series,
b) inducing: 22, induced: 31 and 33 in series,
c) inducing: 23, induced: 31 and 32 in series,
d) inducing: 21, induced: 33 and 32 in series,
c) inducing: 22, induced: 33 and 31 in series,
f) inducing: 23, induced: 32 and 31 in series.

By measuring the coupling of these configurations a, b, c, d, e, f in a repeated sequence, a sampled sine wave signal is obtained, whose period in the absence of movement between cursor and scale is the period of one sequence, and whose phase, as referenced to a signal with the same period as the sequence, has a linear relation to the position x of the cursor on the scale along the measuring path.

Figure 2:
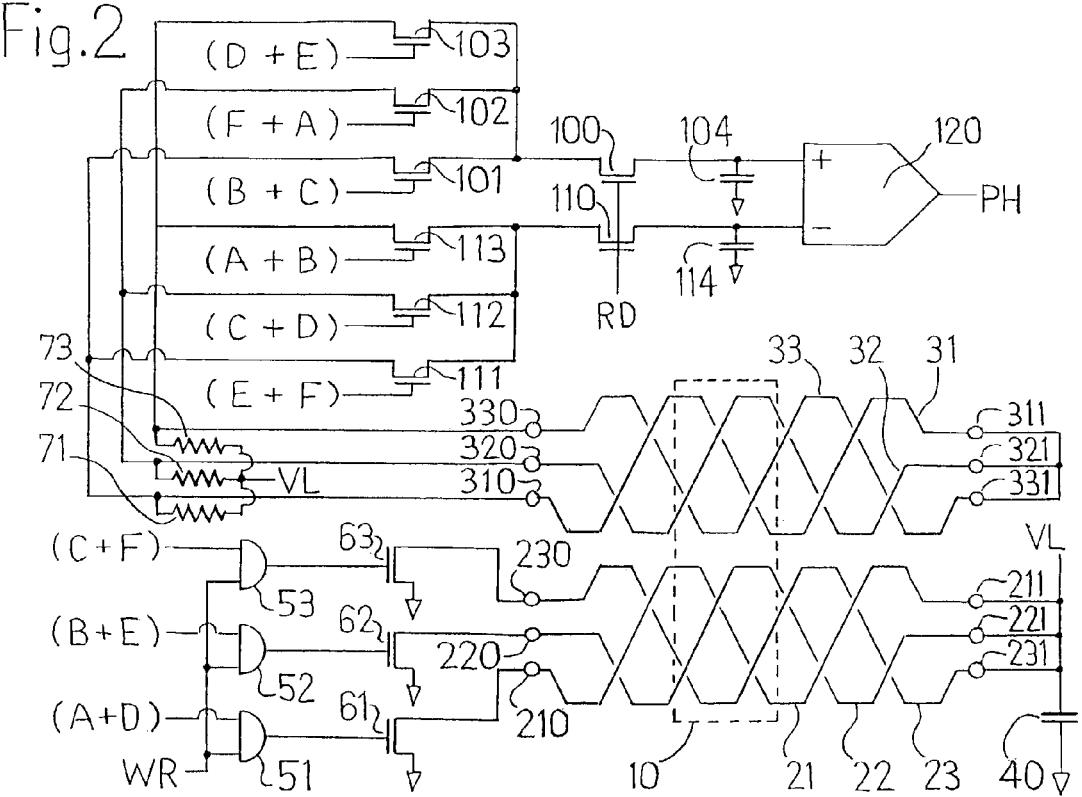
FIG. 2 schematically shows by way of example an electronic measuring circuit of a sensor according to the invention.

The electronic measuring circuit shown schematically in FIG. 2 is connected to the cursor's inducing conductors 21, 22, 23 and induced ones 31, 32, 33. The scale 10 is symbolically displayed as a coupling element in FIG. 2 by one of its conductive loops, drawn as a dotted line. The circuit is implemented in CMOS technology, the transistors 61 to 63, 100 to 103, 110 to 113 being N-channel enhancement FET's. The inducing conductors' 21, 22, 23 ends 211, 221, 223 are connected to a voltage source VL and to a capacitor 40 maintaining a low impedance also at high frequencies. The inducing conductors' other ends 210, 220, 230 are respectively connected to the drains of transistors 61, 62, 63, whose sources are grounded and whose gates are respectively connected to the outputs of "AND" gates 51, 52, 53. The induced conductors' 31, 32, 33 ends 311, 321, 331 are connected together, the other ends 310, 320, 330 being each connected to the voltage source VL through line-terminating resistors 71, 72, 73, as well as to the drain-source channels of respectively two transistors 101 and 111, 102 and 112, 103 and 113. The other end of the channels of transistors 101, 102, 103, respectively 111, 112, 113, is connected via sampling transistors 100, respectively 110 to capacitors 104, respectively 114, which are connected to the differential inputs of a signal-processing circuit 120, which delivers the digital signal PH at its output. The digital control signals A, B, C, D, E, F enabling the measuring configurations a, b, c, d, e, f described above, are activated one by one in sequence. These digital control signals are combined as "OR" functions in FIG. 2, e.g. as (A+B), meaning "A OR B". The combined digital signals (A+D), (B+E), (C+F) control each one input of "AND" gates 51, 52, 53. The combined signals (B+C), (F+A), (D+E), (E+F), (C+D), (A+B) control respectively the gates of FET transistors 101, 102, 103, 111, 112, 113. The two other digital control signals are the read (RD) and write (WR) pulses, activated once during each measuring configuration a, b, c, d, e, and f. The signal WR controls the remaining inputs of "AND" gates 51, 52, 53. The signal RD controls the gates of sampling transistors 100, and 110.

The activated control signal A, B, C, D, E or F selects one of the "AND" gates 51, 52, 53 and connects two of the induced conductors in series to the sampling transistors 100 and 110 respectively, through one of the transistors 101, 102 or 103, and one of the transistors 111, 112 or 113. The write pulse WR then activates the selected "AND" gate which in turn switches one transistor 61, 62 or 63 on, thereby grounding one inducing conductor's end 210, 220 or 230. The other end being at the potential VL, current then flows through the conductor, and potential differences due to coupling via the scale appear between the induced conductors' ends. The read pulse RD, enabled during the write pulse WR, switches the sampling transistors 100 and 110 on, letting capacitors 104 and 114 store the potential of the two induced conductors' ends already connected to the sampling transistors. The line-terminating resistors 71, 72, 73, connected to a suitable bias voltage, here VL for the sake of economy, eliminate unwanted signal reflections at the induced conductors' ends 310, 320, 330. After a short time of typically 20 nanoseconds, the read pulse RD ends first, followed by the write pulse WR. The capacitors 104 and 114 then keep their potential until the next read pulse. The signal-processing circuit 120 amplifies the input potential difference, eliminates harmonics due to the sampling process, and transforms the filtered sine wave into a square wave signal PH by a comparator. The phase difference between this output signal PH and a reference signal, with a period identical to the repetitive sequence's A, B, C, D, E, F period, is measured continuously to keep track of the number of periods traveled. It is then possible to find the position x of the cursor along the scale, the phase difference being a linear function of this position.

Figure 3A:
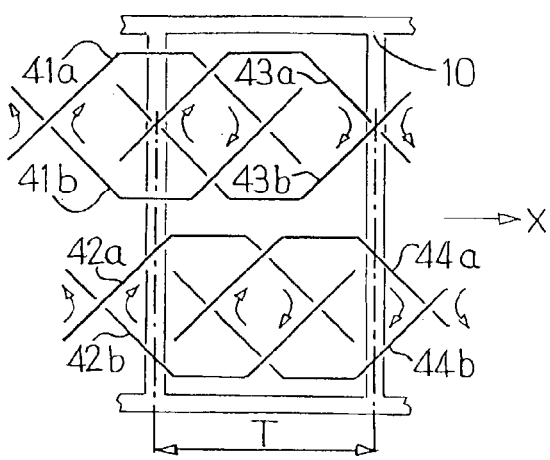
FIGS. 3A and 3B show a configuration of two inducing conductors and two induced conductors of a sensor according to the invention and their mutual couplings as a function of the cursor's position along the scale.

It is also possible, as shown by way of example in FIG. 3A, to have an embodiment with only two inducing cursor conductors (42a, 42b and 44a, 44b) and two induced ones (41a, 41b and 43a, 43b). Each conductor forms a back-and-forth zigzag, i.e. a series of loops equivalent to as many closed current loops. For clarity's sake, only one such loop per conductor is shown in FIG. 3A, constituted of one hairpin turn going one way (a suffix) and one hairpin turn going the other way (b suffix) along the measuring path. The scale (10) is also displayed by one of its conductive loops.

Figure 3B:
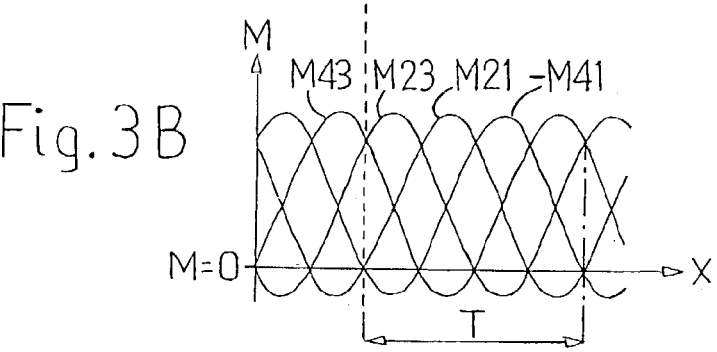

For the coupling, or transformer ratio, from any inducing cursor conductor to any induced one via the scale to vary uniformly as a function of x, the absolute shift measured along x has to be the same, as said coupling, being the product of the couplings from inducing conductor to scale and from scale to induced conductor is constant for a given shift between inducing and induced conductor, and for a given scale loop shift relatively to these two conductors. In the example shown in FIG. 3A, both inducing conductors' zigzags, as well as both induced conductors' zigzags are mutually shifted by T/2, and the inducing and induced conductor's zigzags are mutually shifted by T/4. The four couplings or transformer ratios from each inducing to each induced conductor are as follows:

coupling M21: from inducing conductor 42a, 42b to induced conductor 41a, 41b,
coupling M23: from inducing conductor 42a, 42b to induced conductor 43a, 43b,
coupling M43: from inducing conductor 44a, 44b to induced conductor 43a, 43b,
coupling M41: from inducing conductor 44a, 44b to induced conductor 41a, 41b, FIG. 3B shows couplings or transformer ratios M21, M23, M43 and −M41 in ordinate (M) as a function of the cursor's position along the scale, shown in abscissa (x). The cursor's position along the scale displayed in FIG. 3A is shown by the dotted line in FIG. 3B. Couplings M21 and −M41 are nil for this position because of the absence of coupling between scale 10 and induced conductor 41a, 41b, mutually shifted by T/2.

The polarity of coupling or transformer ratio M41 is shown inverted (−M41) in FIG. 3B. Indeed, taking in account the polarity of the zigzags' loops, given by the conductors' connections to the electronic circuit and shown by arrows in FIG. 3A, the shift between inducing and induced loops equals T/4 for couplings M21, M23, M43, but is 5T/4 for coupling M41. In order to get four equal shifts of T/4, the inducing zigzag 44 or the induced zigzag 41 must be electrically shifted by T while coupling M41 is measured. This amounts to inverting the connections of the inducing conductor 44 or of the induced one 41, i.e. inverting the polarity of the measured coupling −M41. More generally, no matter which polarity each loop has, the conductor geometry described above and shown in FIG. 3A will always yield equal shifts between inducing and induced loops for all four coupling measurements, if for one of them the polarity is inverted, e.g. by inverting one conductor's connections for one measurement.

Their correct measurement polarity thus set, couplings or transformer ratios M21, M23, M43 and −M41 shown as a function of the cursor's position x along the scale in FIG. 3B are then four sine waves of period T progressively shifted by T/4, with the same amplitude and the same continuous component, as they are all measured between inducing and induced zigzags mutually shifted by the same distance T/4, taking the zigzags' loop polarity in account. The cursor's position x on the scale may then easily be derived from these couplings, e.g. as follows: said continuous component may be rejected by measuring these couplings in repeated sequence and eliminating it by filtering, yielding a sampled sine wave whose phase is proportional to x.

With such a cursor having only two inducing and two induced conductors, it is easy, by a symmetric layout, to match the inductances and more generally the transmission line characteristics between the two conductors in each group to get uniform coupling, yielding better measuring accuracy.

Figure 4A:
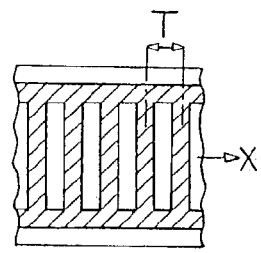
Figure 4B:
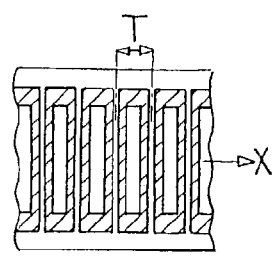
Figure 4C:
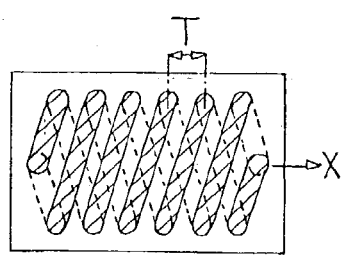
Figure 4D:
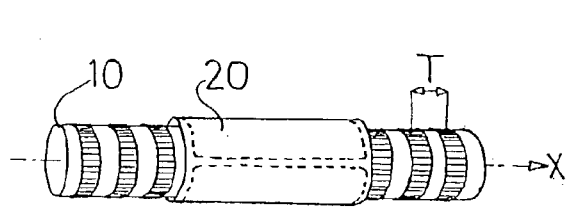
Figure 4E:
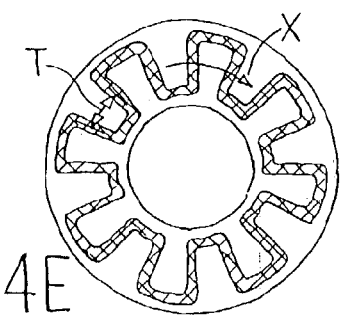

The ladder-shaped scale 10 shown in FIG. 1 may also be realized as a printed circuit, as shown in FIG. 4A. The substrate may be dielectric or ferromagnetic: in the latter case, the coupled signal may be enhanced, even for a conductive substrate, as is the case for some steels, whose mechanical properties may be of interest. On a substrate, the conductor may consist of a series of mutually insulated loops, as shown in FIG. 4B: the advantage is that coupling along the scale is prevented. If, conversely, the groups of inducing and induced cursor conductors are not alongside but follow one another, e.g. for limiting the sensor's width, the signal must couple along the whole scale. This is the case for the scale in FIG. 4C, whose conductor forms a back-and-forth zigzag on two metal layers, one of which is shown in dotted lines. Another embodiment limiting the sensor's width is shown in FIG. 4D, as a coaxial cylindrical scale 10 and cursor 20, for axial displacement. The groups of interlaced conductors outlined by their perimeter in dotted lines, stretch alongside on the cursor 20, occupying the same portion of the axis, and the scale's 10 conductors are coaxial rings spaced out by T: the sensor's diameter may be small, and measurement is unaffected by rotation around the axis. Other embodiments are suitable for rotary encoders, e.g. the disk-shaped scale with a zigzag conductor shown in FIG. 4E.

The invention is obviously not limited to the embodiments and variants above, which are mostly sensors with a scale longer than the cursor. But these embodiments would work with shorter scales too, having at the limit a single conductive loop, provided that the scale conductors stay well within the cursor conductors' ends for the entire measuring range.

The invention claimed is:

1. Inductive position sensor including a scale (10) and a cursor (20) movable relatively to each other along a measuring path (x), the scale (10) including one or several conductors forming a series of conductive loops spaced along the measuring path by a pitch T, the cursor (20) including inducing conductors (21 to 23; 42, 44) and induced conductors (31 to 33; 41, 43), connected to an electronic measuring circuit and each forming a series of alternating hairpin turns spaced along the measuring path by a pitch T, characterized in that the cursor's (20) conductors (21 to 23, 31 to 33; 41 to 44) are arranged in at least one first group and in at least one second group separate from the at least one first group, each group having two interlaced conductors set apart by a multiple of T/2, coupling between the inducing and induced conductors from the at least one first and the at least one second groups taking place via the scale's (10) conductors,
   wherein the cursor (20) includes two inducing conductors (42, 44) and two induced conductors (41, 43), the two inducing conductors' hairpin turns being shifted from each other by T/2 along the measuring path (x), the two induced conductor's hairpin turns being shifted from each other by T/2 along the measuring path, and the inducing conductors' hairpin turns being shifted from the induced conductor's hairpin turns by T/4 along the measuring path (x).

2. Inductive position sensor including a scale (10) and a cursor (20) movable relatively to each other along a measuring path (x), the scale (10) including one or several conductors forming a series of conductive loops spaced along the measuring path by a pitch T, the cursor (20) including inducing conductors (21 to 23; 42, 44) and induced conductors (31 to 33; 41, 43), connected to an electronic measuring circuit and each forming a series of alternating hairpin turns spaced along the measuring path by a pitch T, characterized in that the cursor's (20) conductors (21 to 23, 31 to 33; 41 to 44) are arranged in at least one first group and in at least one second group separate from the at least one first group, each group having two interlaced conductors set apart by a multiple of T/2, coupling between the inducing and induced conductors from the at least one first and the at least one second groups taking place via the scale's (10) conductors,
   wherein the cursor (20) includes two inducing conductors (42, 44) and two induced conductors (41, 43), the two inducing conductors' hairpin turns being shifted from each other by T/2 along the measuring path (x), the two induced conductor's hairpin turns being shifted from each other by T/2 along the measuring path, and the inducing conductors' hairpin turns being shifted from the induced conductor's hairpin turns by T/4 along the measuring path (x),
   wherein the electronic circuit is arranged to measure four couplings (M21, M23, M43, M41) from each inducing conductor to each induced conductor via the scale, each coupling's measurement polarity being set so that the four couplings measured (M21, M23, M43, M41) as a function of a position of the cursor along the scale are four sine waves of period T progressively shifted by T/4, having a same amplitude and a same continuous component.

\* \* \* \* \*